UNITED STATES PATENT OFFICE.

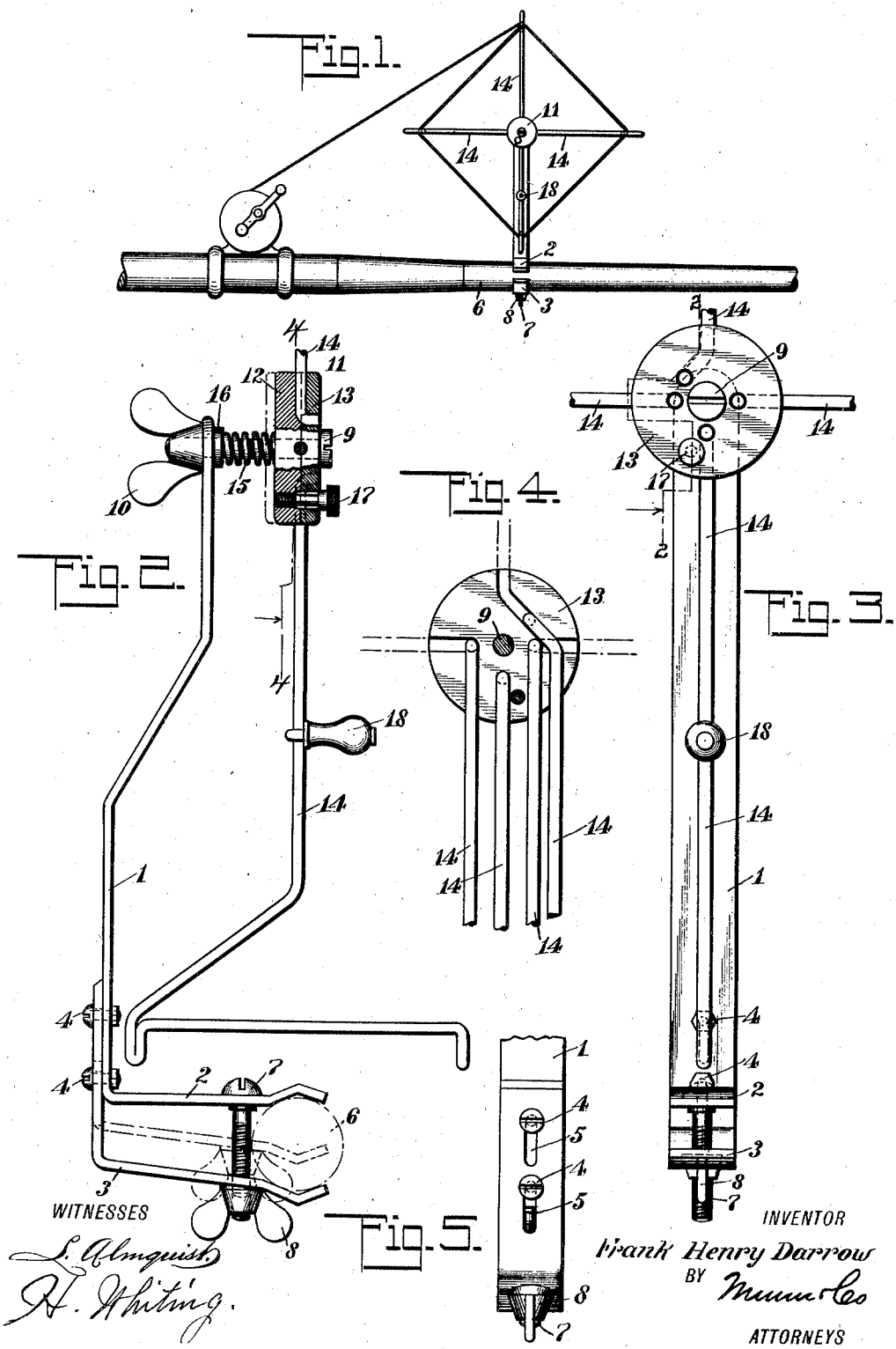

FRANK HENRY DARROW, OF ALBION, MICHIGAN.

FISHING-LINE-DRYING REEL.

967,734.

Specification of Letters Patent. Patented Aug. 16, 1910.

Application filed April 24, 1909. Serial No. 491,875.

*To all whom it may concern:*

Be it known that I, FRANK HENRY DARROW, a citizen of the United States, and a resident of Albion, in the county of Calhoun and State of Michigan, have invented a new and Improved Fishing-Line-Drying Reel, of which the following is a full, clear, and exact description.

This invention relates to an improved collapsible reel adapted to be attached to a fishing-rod, and also adapted to receive the fishing line and the reel thereon, for the purpose of drying the same after using.

An object of the invention is to provide a simple, compact and inexpensive device, which may be secured to rods of varying size, and which may be extended for the purpose of drying a fishing line, or folded up when not in use.

A further object is to provide means for the ready attachment of a regular fishing reel temporarily upon the frame of a line-drying reel when a dry line is to be rewound from the drying-reel onto the fishing reel.

Generally speaking, the invention consists in a collapsible reel, a support having an adjustable clamp for said reel, and means for rotating said reel.

The invention further consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 1 is a side view showing my device attached to a fishing-rod and in the act of removing the wet fishing line from the fishing reel; Fig. 2 is a vertical side view, partly in section on the line 2—2 in Fig. 3, showing the method of attaching the arms of the reel to the hub; Fig. 3 is a view taken at right-angles to Fig. 2; Fig. 4 is an enlarged view, showing the arms of the reel collapsed, and is taken on the line 4—4 in Fig. 2; and Fig. 5 is an end view of the clamping mechanism.

Referring more particularly to the separate parts, 1 indicates a supporting frame, which may be of any suitable form and material, but preferably consists of a strip of metal bent at an angle at one end to form a stationary jaw 2 of a clamp. The other jaw of the clamp is formed by a right-angle member 3 made of any suitable form and material, which is adapted to slidingly engage suitable fastening means, such as bolts 4, which are secured to the support 1 and slidingly engage in slots 5 on the right-angle jaw 3. The jaws 2 and 3 are concaved at their ends so as to more readily engage a fishing-rod, which is indicated by the numeral 6.

In order to bring the jaws 2 and 3 close together and adjust them to clamp rods of varying sizes, there is provided a screw 7 which passes through openings in each of the jaws and is secured thereto by means of a thumb-nut 8, which is adapted to be adjusted in and out on the screw 7.

The support 1 has at the opposite end to the clamp, a perforation through which is adapted to pass a pivot-screw 9, adjustably secured to said support by means of a thumb-nut 10. Rotatably supported on the pivot-screw 9, there is provided a hub 11, which is formed in two cylindrical parts 12 and 13. Each of the parts 12 and 13 of the hub have in their facing surfaces oppositely situated grooves, in which are adapted to be removably secured, spokes or reel arms 14, which are also adapted to be pivoted in the hub portion 13 by means of right-angle bends at the ends thereof. Each hub portion 13 is backed up by the head of the screw 9, and the two hub portions 12 and 13 are held yieldingly together by means of a spring 15 which engages the hub portion 12 on one side and a ring 16 on the screw 9 on the other side.

In order to rigidly secure the hub portions 12 and 13 together, there is provided a screw 17, which is adapted to engage a screw-threaded opening in the hub portion 12 and pass through a smooth opening in the hub portion 13. The groove which is used to secure the uppermost reel arm is angular in shape, so as to permit this arm to extend at right-angles to two adjacent arms and at the same time to permit it to avoid the pivot-pin 9 and fall substantially parallel to the other arms in their folded up position, as indicated in Fig. 4. This brings the pivot point of the top arm into an unsymmetrical position relative to the pivot-points of the other arms.

Each of the arms 14 preferably consists in a single wire which extends directly out from the hub 11 for a considerable distance, and is then bent at an obtuse angle thereto for a relatively shorter distance; a further bend is then taken, so as to bring the metal into substantially the same direction as the first length; the rod is then bent back on itself to run parallel to the last portion and then bent at right-angles thereto, to form a cord-carrying surface, and then at right-angles to this last portion, to form a flange to hold the cord or fishing-line thereon.

Secured in any well-known manner to one of the arms 14 there is provided a handle 18, which is adapted to rotate the reel as a whole.

The operation of the device will be readily understood from the above description. When it is desired to dry a fishing line after it has been used, the supporting member 1 is clamped to the fishing-rod 6 adjacent to the fishing reel, and the reel arms 14 extended into their upper position and secured in such position by means of the screw 17. The fishing line is then secured to one of the lengths of a spoke which extends substantially parallel to the pivot-pin 9, and the reel is revolved, spreading the line gradually over the whole length of said last-mentioned portion, so that the line has the greatest amount of surface exposed to the drying action of the air.

When the fishing line is thoroughly dried, it may be re-wound on the fishing reel, and then the drying reel may be collapsed by unfastening the screw 17 and permitting the spoke arms 14 to fall into the position shown in Fig. 4, where they may be readily stored in a small compass, the reel being in the meantime removed from the fishing-rod.

Having thus described my invention, I claim as new and desire to secure by Letters Patent:—

1. In a device of the class described, the combination with a support, of a pivot-pin secured to said support, a hub secured to said pivot-pin, said hub being divided into two parts, reel-arms secured between said parts, means for yieldingly holding said hub parts together, and detachable means for rigidly securing said hub parts together.

2. In a device of the class described, the combination with a support, of a pivot-pin secured to said support, a hub rotatably supported on said pivot-pin, and a plurality of reel-arms removably secured between said parts of said hub, said reel-arms being unsymmetrically pivoted to one of said hub parts.

3. In a device of the class described, the combination with a support, of a pivot-pin rotatably secured to said support, a hub mounted on said pivot-pin, said hub comprising two parts having grooves in their facing surfaces, a plurality of reel arms pivotally secured in one of said parts and adapted to be removably secured in said grooves in said hub parts, means for yieldingly holding said hub parts together, detachable means for rigidly securing said hub parts together, and a handle on one of said reel arms adapted to rotate all of said reel arms, each of said reel arms consisting of a single piece of metal bent to form a flanged line-carrying surface.

4. In a device of the class described, the combination with a hub, of a plurality of reel arms removably secured to said hub, said reel arms being unsymmetrically pivoted to said hub.

5. In a device of the class described, the combination with a hub composed of two members, of a plurality of reel arms removably secured between the members of said hub, said reel arms being unsymmetrically pivoted to one of said members.

6. In a device of the class described, the combination with a hub, of a plurality of reel arms unsymmetrically pivoted to said hub.

In testimony whereof I have signed my name to this specification in the presence of two subscribing witnesses.

FRANK HENRY DARROW.

Witnesses:
 EDWARD R. LOUD,
 OTIS A. LEONARD.